United States Patent
Hung

(12) 
(10) Patent No.: US 6,584,244 B2
(45) Date of Patent: Jun. 24, 2003

(54) SWITCHED FILTER FOR OPTICAL APPLICATIONS

(75) Inventor: Henry Hung, Paradise Valley, AZ (US)

(73) Assignee: Donald J. Lenkszus, Scottsdale, AZ (US)

( * ) Notice: Subject to any disclaimer, the term of this patent is extended or adjusted under 35 U.S.C. 154(b) by 25 days.

(21) Appl. No.: 09/810,898

(22) Filed: Mar. 17, 2001

(65) Prior Publication Data

US 2002/0131686 A1 Sep. 19, 2002

(51) Int. Cl.[7] .................................................. G02B 6/28
(52) U.S. Cl. .......................................... 385/24; 359/128
(58) Field of Search .............................. 385/15, 16, 17, 385/18, 24; 359/128

(56) References Cited

U.S. PATENT DOCUMENTS

| 6,252,689 | B1 | * | 6/2001 | Sharp ........................... 359/168 |
| 6,404,940 | B1 | * | 6/2002 | Tsuyama et al. ............... 385/17 |
| 6,411,410 | B1 | * | 6/2002 | Wright et al. ................. 359/125 |

* cited by examiner

*Primary Examiner*—Javaid Nasri
(74) *Attorney, Agent, or Firm*—Donald J. Lenkszus

(57) ABSTRACT

A switched optical wavelength selective reflector includes a 1×n bi-directional optical switch coupled to a plurality of wavelength selective reflective filters.

25 Claims, 6 Drawing Sheets

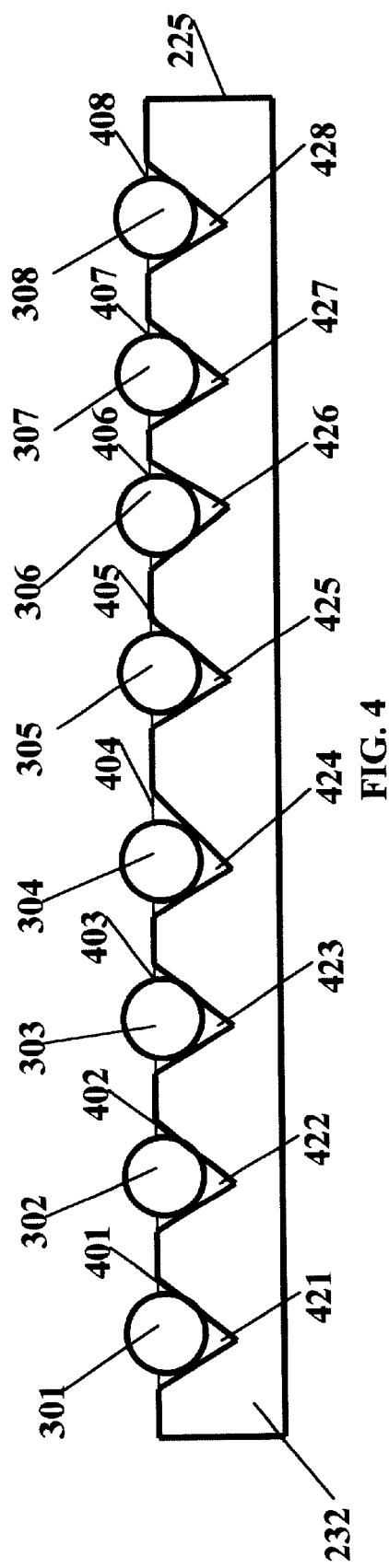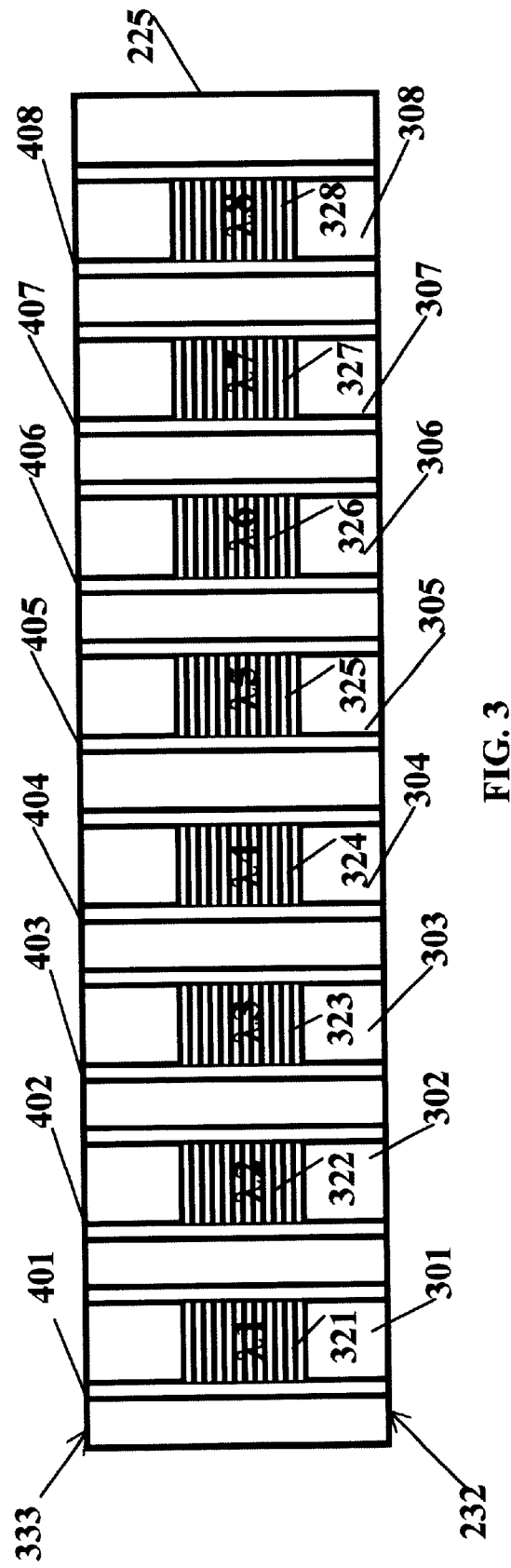

SWITCHED FILTER FOR OPTICAL APPLICATIONS

BACKGROUND OF THE INVENTION

This invention relates to optical filters, in general, and to high performance optical wavelength filters, in particular.

It is desirable to provide high performance optical wavelength filtering for a variety of applications in the optical communications field. It would be highly desirable to provide a filter that has a broad optical tuning range, along with a fast tuning speed. Prior attempts to provide such a tunable filter have failed to provide a broad tuning range in combination with fast tuning speed. In prior tunable filters, the tuning speed is, at best, in the microsecond speed range, whereas a truly rapid tuning speed should be in the nanosecond speed range. In addition it is highly desirable that any such filter have an insertion loss of 2 dB or better. Until now, no existing filter technology meets these rigid requirements.

SUMMARY OF THE INVENTION

In accordance with the principles of the invention a switched optical wavelength selective reflector includes a bi-directional optical switch coupled to a plurality of wavelength selective reflectors. In one embodiment of the invention, the switch is a bi-directional optical switch having a first port and a plurality, N, of second ports. The optical switch is responsive to control signals for establishing an optical coupling between a first port and a selected one port of the plurality of second ports. Each of the second ports has coupled thereto one of a plurality of wavelength selective reflectors. Each of the wavelength selective reflectors is coupled to a corresponding one of the optical switch second ports. Each wavelength selective reflector is selected to reflect optical signals at a predetermined one optical wavelength selected from a plurality of predetermined optical wavelengths. Optical signals at a selected predetermined one optical wavelength received at the switch first port are reflected back to the first port by the switch selected one wavelength selective reflectors.

In accordance with one aspect of the invention the optical switch is formed on a first substrate of electro-optic material. In one embodiment of the invention, the substrate comprises $LiNbO_3$.

In accordance with the principles of the invention, in one embodiment of the invention the optical switch comprises a 1×N switch.

Further in accordance with the invention, one embodiment of the invention includes a second substrate carrying the plurality of wavelength selective reflectors. In this embodiment, the second substrate comprises silicon and is bonded to the first substrate.

In accordance with another aspect of the invention each wavelength selective reflectors comprises a reflective filter. In the illustrative embodiment of the invention, each reflective filter comprises a fiber Bragg grating.

In accordance with another aspect of the invention, a bi-directional optical switch is formed on the same substrate as the plurality of wavelength selective reflectors. The optical switch is responsive to control signals for establishing an optical coupling between a first port and a selected one of the wavelength selective reflectors.

BRIEF DESCRIPTION OF THE DRAWING

The invention will be better understood from a reading of the following detailed description taken in conjunction with the several drawing figures in which like reference designations are used to identify like elements in the figures, and in which:

FIG. 3 illustrates a specific structure in accordance with the embodiment of FIG. 2;

FIG. 4 illustrates a portion of the structure of FIG. 3 in greater detail;

DETAILED DESCRIPTION

Figure 1:
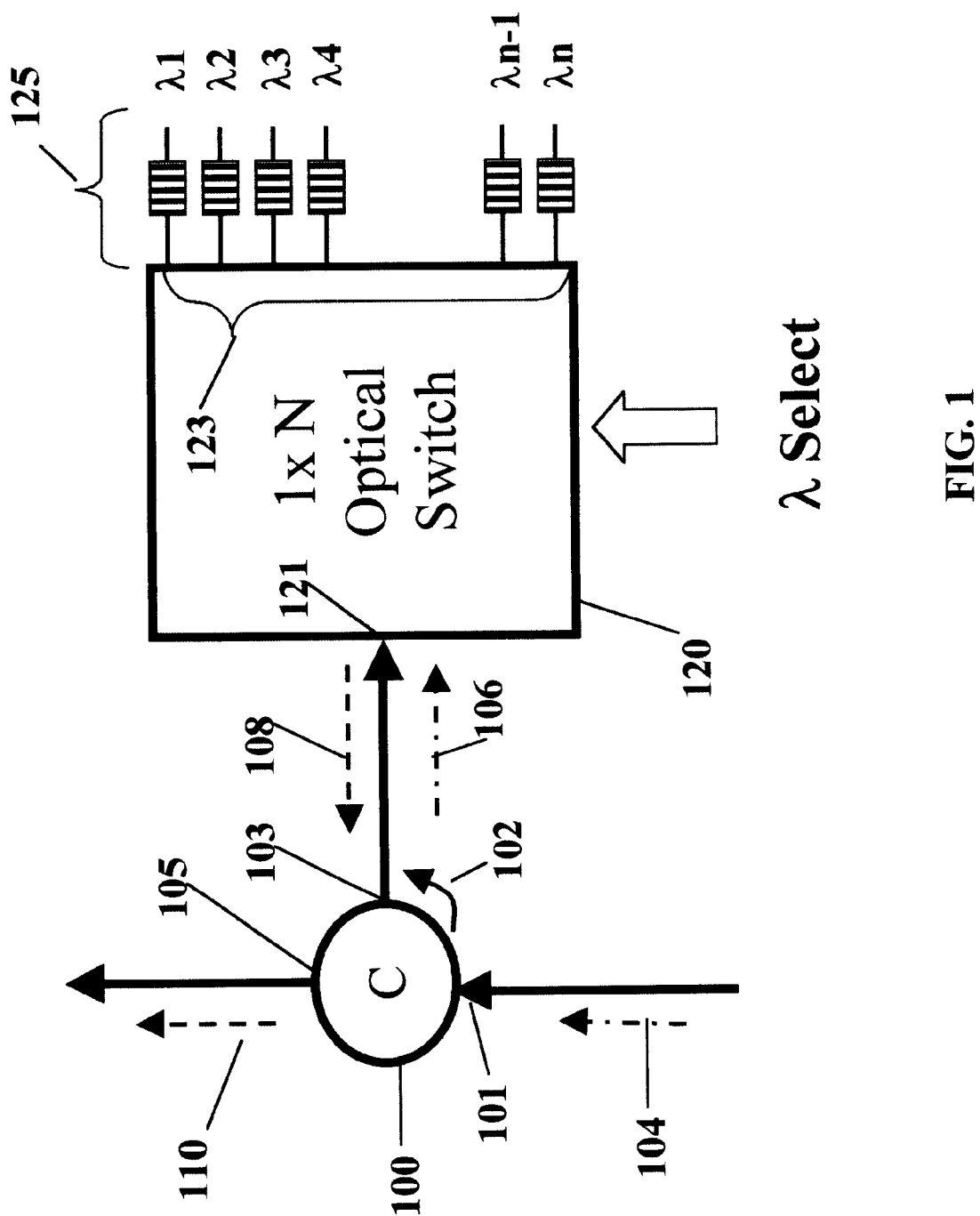
FIG. 1 shows a structure in accordance with the principles of the invention.

FIG. 1 illustrates the general configuration or a rapid switched narrow line filter for optical applications in accordance with the principles of the invention. Optical signals from a source are applied to an input port 101 of a three port optical circulator 100. Optical circulator 100 has a second port 103 coupled to optical switch 120. A third port 105 serves as an output port. Circulator 100 may be any one of a number of known circulators. An isolator may be inserted into the optical path coupling the source of optical signals to port 101 to make port 101 unidirectional. Similarly, an optical isolator may be inserted into the optical path coupled to port 105 so that optical signals flow unidirectionally out from port 105. Port 103 is a bi-directional port that receives optical signals from port 101 and couples optical signals received at port 103 to port 105. The polarity of circulator 100 is indicated by directional arrow 102. The flow of input optical signals to switch 120 is shown by arrows 104, 106. The flow of wavelength selected optical output signals from optical switch 120 to port 103 and out from port 105 is shown by arrows 108, 110. Optical switch 120 is operable to couple port 121 to any one of a plurality, n, of parts 123. Each of the plurality of ports 123 has coupled thereto a corresponding one of a plurality of reflective wavelength filters 125. Each reflective wavelength filter is a narrow filter and in the illustrative embodiment may be either a fiber Bragg grating or a dielectric interference filter. Both fiber Bragg gratings and dielectric interference filters are known in the art. Each wavelength filter is selected to reflect optical signals that are only at a specific centerline wavelength designated as λ1–λn. The number of filters 125 utilized is dependant upon the specific application and the incremental wavelength difference between adjacent selected wavelengths. Stated another way, the number of filters is determined by the wavelength range over which tuning is to occur and the incremental wavelength, or wavelength granularity between selections. Optical switch 120 receives wavelength selection signals and couples port 121 to a selected one of ports 123 based upon the selection signals. The selected one of ports 123 is made based upon the desired wavelength of optical signals desired. Each of the narrow filters 125 reflects optical signals only at the particular center wavelength of the filter and passes or in effect absorbs all other optical signals. Input optical signals received at circulator 100 port 101 are coupled to port 103 and coupled to port 121 of switch 120. Switch 102 couples the optical signals to a selected one of filters 125. The selected filter 125 is determined by wavelength select signals received by switch 120.

The selected filter 125 reflects only optical signals at the selected wavelength back to port 121 and thence to circulator 100 port 103. The selected wavelength optical signals are coupled out of circulator 100 at port 105. In a first embodiment of the invention, 1×N optical switch 120 is an electro-mechanical switch of a type well known in the art or a thermal-optic switch also of a type known in the art. In a second embodiment of the invention, 1×N optical switch 120 is an integrated optic waveguide switch formed on a LiNbO$_3$ substrate or a substrate of other electro-optic material. This embodiment has the advantages of a high wavelength channel count, fast switch speed and small size.

Figure 2:
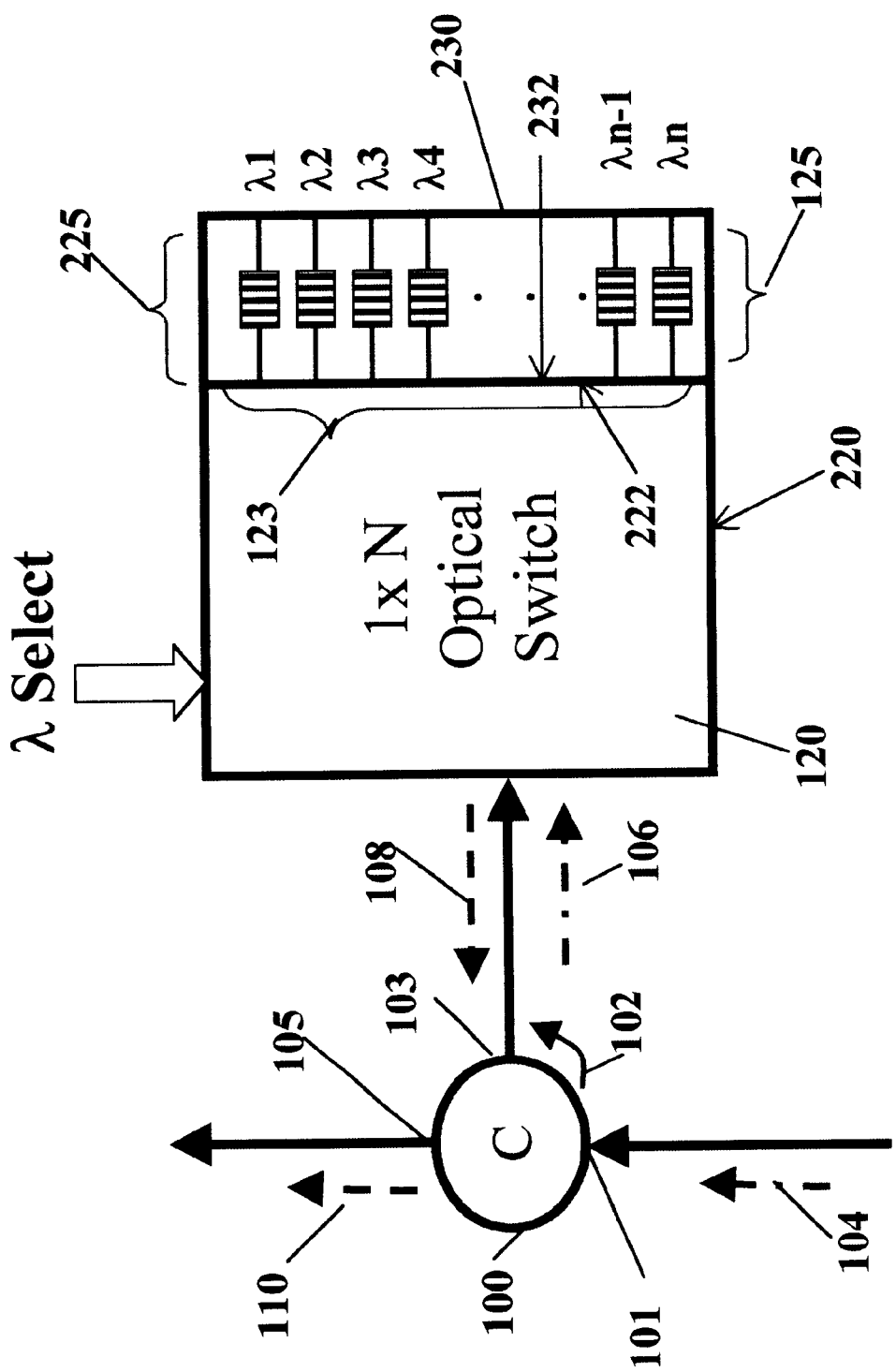
FIG. 2 is a second embodiment in accordance with the principles of the invention.

In a second embodiment of a rapid switched narrow line filter in accordance with the invention shown in FIG. 2, 1×N optical switch 120 is again formed on a LiNbO$_3$ substrate 220 or a substrate of other electro-optic material. Particular details of the 1×N switch structure are not shown on the structure of FIG. 2, however, in this particularly advantageous embodiment of the invention, the plurality of filters 125 is arranged as a fiber Bragg grating array 225 of filters. A plurality, n, of fiber Bragg gratings 225 are provided on a separate substrate 230 that is affixed to substrate 220. More specifically, a plurality, n, of fiber Bragg gratings 225 are bonded to grooves or channels formed on the surface of a substrate 230. In the specific embodiment shown, substrate 230 is selected to be a silicon substrate. The end surface 232 of substrate 230 that is adjacent to substrate 220 is polished. End surface 232 is bonded to surface 222 of 1×N optical switch substrate 220. Bonding of substrate 220 to substrate 230 may be by any one of several known arrangements for bonding substrates together.

FIGS. 3 and 4 show a fiber Bragg grating array 225 with 8 fiber Bragg grating filters λ1–λ8. Each of the fiber Bragg grating filters λ1–λ8 is a separate fiber segment 301–308 having a Bragg grating 321–328 formed thereon. Each fiber segment is a photosensitive fiber onto which a Bragg grating is formed by using ultraviolet light in conjunction with a different period phase mask for each different filter center wavelength. The forming of Bragg gratings on fibers utilizing such a technique is known in the art. Silicon substrate 230 has a plurality of grooves 401–408 formed on a top surface 412. Each of the grooves 401–408 is shown as a "v" groove, but may be of different cross sectional shape, and rather than being shaped as a "groove" may be a channel. By use of the term "channel", it will be understood that various cross-sectional grooves is included. In the embodiment shown, the grooves or channels may be formed by use of a saw, or by etching or any other process that will permit controlled depth formation of channels. For example, the v-grooves may be formed by providing an oxide masking layer on the silicon substrate, utilizing a photolithography process to define each of the grooves, and applying an etchant to form the grooves 401–408. After the grooves 401–408 are formed, the fiber segments 301–308 are placed in the grooves 401–408 with fixed spacing and are bonded in position with epoxy. The end surfaces 232, 333 of substrate 230 as well as the corresponding end faces of fiber segments 301–308 are polished. The corresponding end surface 222 of substrate 220 is likewise polished. The fiber Bragg grating array 225 is aligned with the 1×N switch substrate 220 and bonded thereto. The bonding may with epoxy or any other method of bonding that provides good optical coupling.

Figure 5:
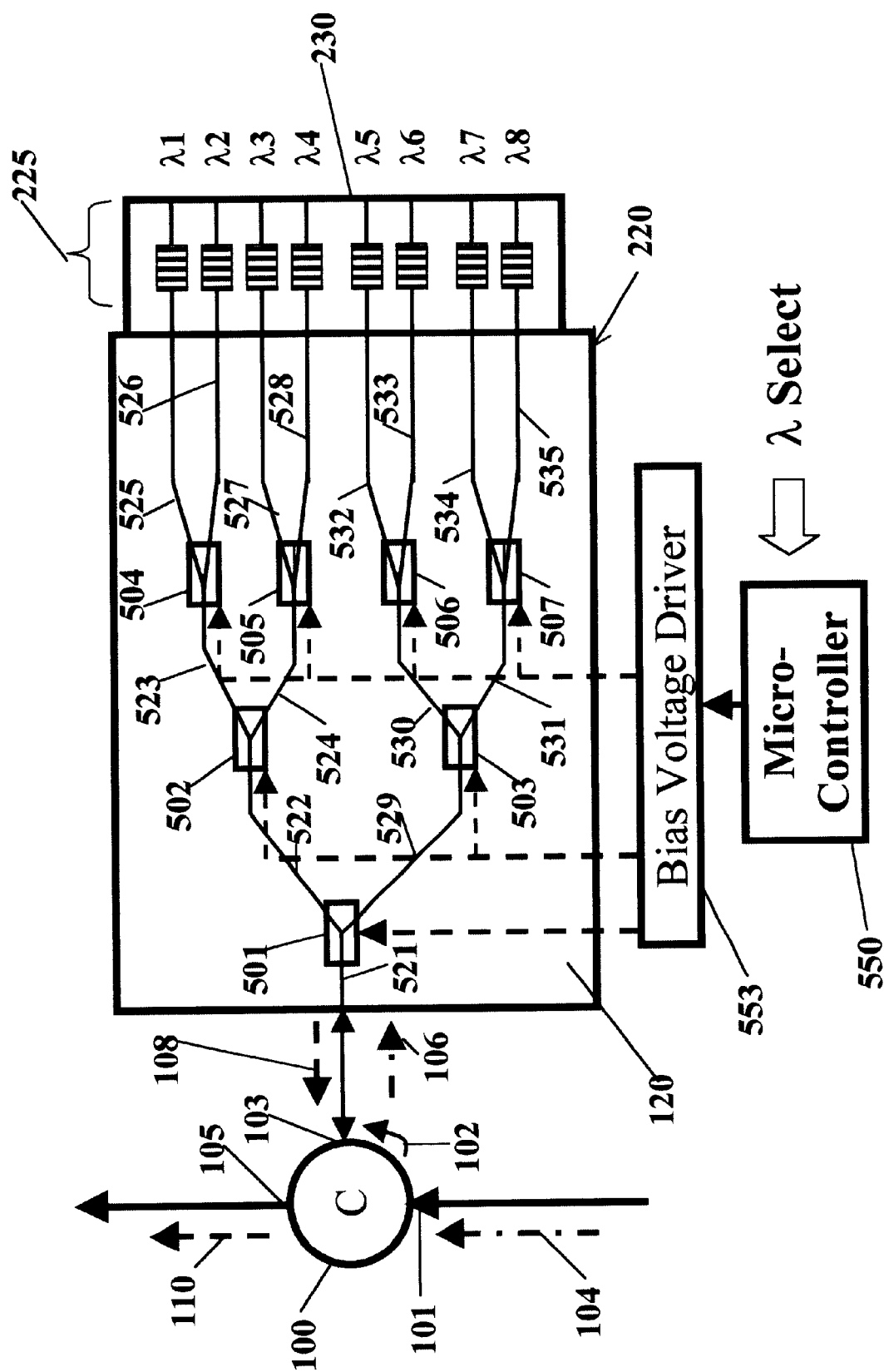
FIG. 5 is a top view of a fiber Bragg grating array in accordance with one aspect of the present invention.

Turning now to FIG. 5, the rapid switching narrow line filter of FIG. 2 is shown with 1×N optical switch 120 shown in greater functional detail. 1×N optical switch 125 is formed from a tree of 1×2 optical switches 501–507 and waveguides 521–535. Switches 501–507 are selectively operated by a microprocessor or micro-controller 550 that responds to wavelength signals indicating a desired optical wavelength and determines which optical switches 501–507 to operate to couple optical signals to the corresponding one fiber Bragg grating 125 of array 225.

Figure 6:
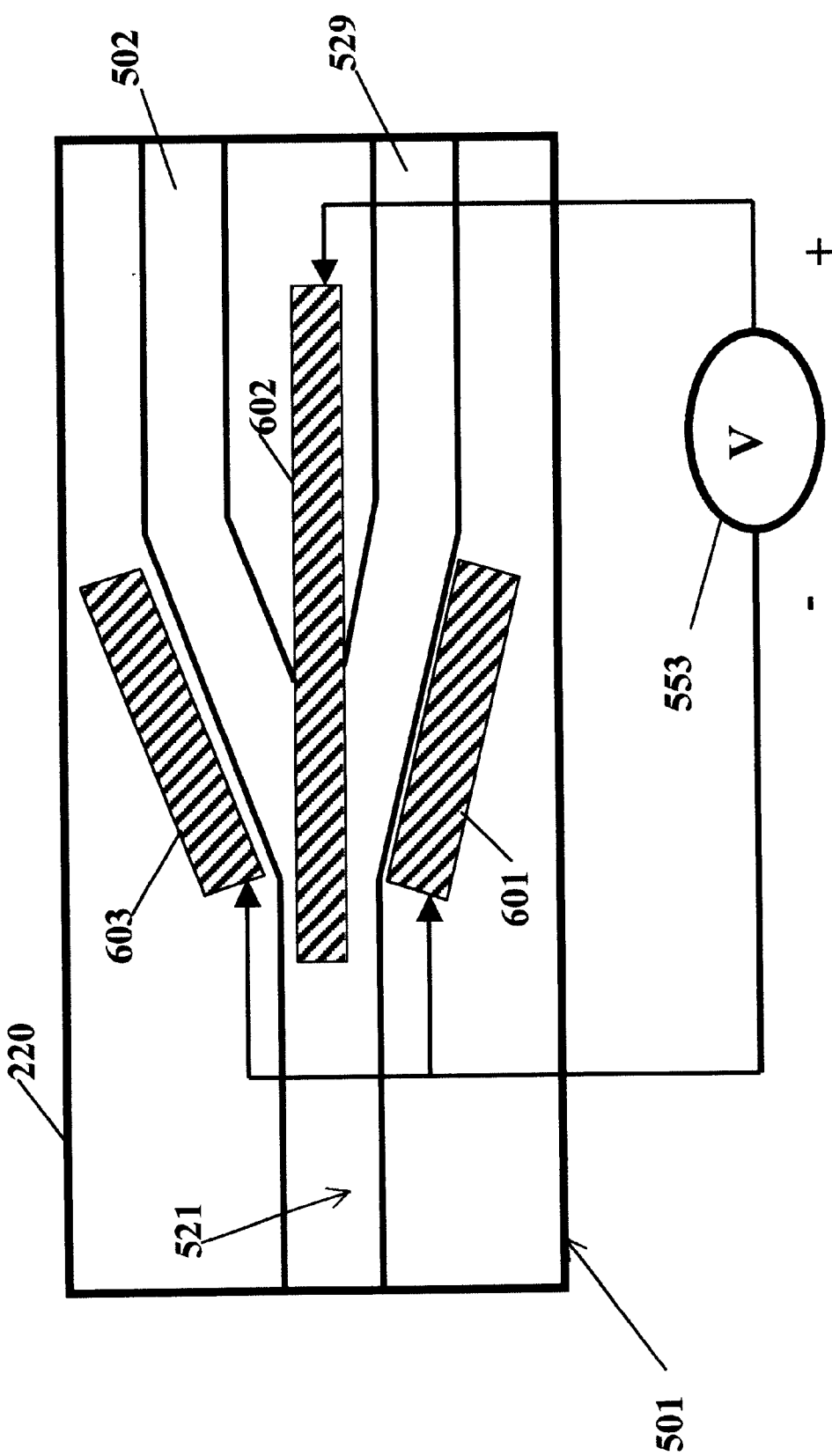
FIG. 6 is an end view of the array of FIG. 5.

FIG. 6 illustrates a 1×2 switch 501 that is appropriate for use in the 1×N switch arrangement 220 of the invention. Switch 501 is a bi-directional, polarization independent 1×2 switch design. It includes a waveguide that forms a "y" having first, second and third waveguide legs 521, 522, 529. The waveguides 521, 522, 529 are formed on a substrate utilizing known fabrication methods for forming optical waveguides on electro optic substrates such as LiNbO$_3$. Switch 501 further includes three electrodes 601, 602, 603 that are used to determine the optical path through switch 501. The application of bias voltage V to electrodes 601, 602, 603 determines whether waveguide portion 521 is coupled to waveguide portion 522 or 529. The high voltage switch 501 can switch both TE and TM mode signals. Switch 501 has an on-off ratio of greater than 20 dB. In a reflective design, a double pass produces 40 dB of isolation. With this building block switch structure other sized switches may be provided.

Although switch 501 is shown in detail in FIG. 6, each of the switches 501–507 is of the same construction and all are fabricated on a single substrate 220 in the illustrative embodiment. The waveguides 521–535 are formed utilizing any of the known techniques for formation of waveguides in electro-optic substrates.

Figure 7:
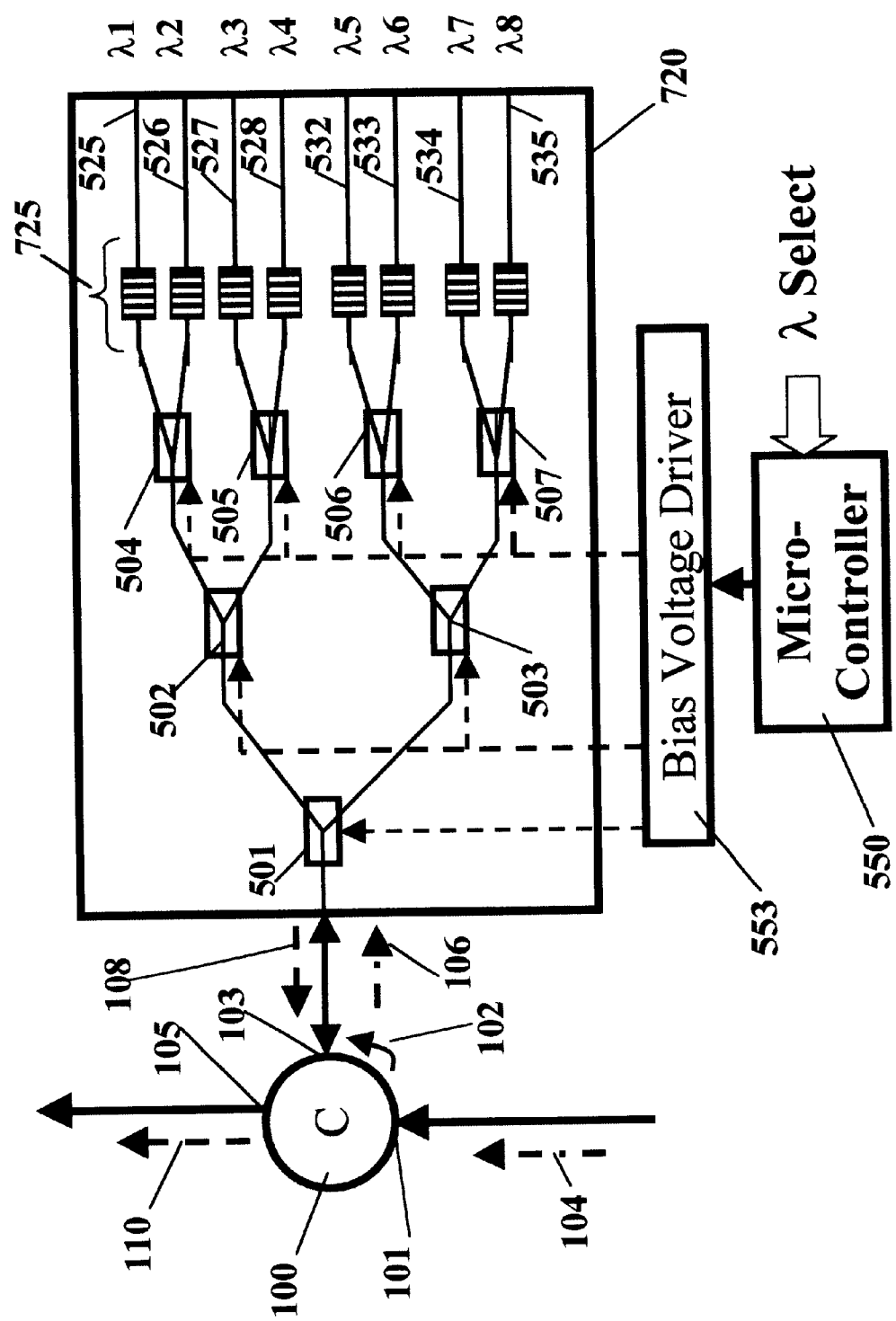
FIG. 7 illustrates an alternate embodiment of the structure of FIG. 3.

FIG. 7 illustrates another embodiment of the invention in which the reflective filters 525–535 are formed on the same substrate 720 as the 1×N switch. The substrate is LiNbO$_3$ or another electro optic material. Each filter 725 is formed on a waveguide 525–528, 532–535 formed on substrate 720. Each waveguide has a photosensitive region onto which a Bragg grating is formed. Operation of the structure of FIG. 7 is the same as that of FIG. 5.

It should be apparent to those skilled in the art that although the structures shown in the drawing figures illustrate only a 1×8 switch and 8 wavelengths, the number of wavelengths and the size of the 1×N switch is a matter of design selection to provide the desired number of selectable wavelengths. For example, 1×16 and 1×32 switches can be built. If it is desired to accommodate a larger number of wavelengths, more wavelengths can be accommodated by cascading several stages. For example, to accommodate 128 wavelengths, a 1×4 switch can be cascaded with four 1×32 switches.

Various other changes and modifications may be made to the illustrative embodiments of the invention without departing from the spirit or scope of the invention. It is intended that the invention not be limited to the embodiments shown, but that the invention be limited in scope only by the claims appended hereto.

What is claimed is:

1. Optical apparatus, comprising:
   a bi-directional optical switch having a first port and a plurality, N, of second ports, said optical switch being responsive to control signals for establishing an optical coupling between said first port and a selected one of said plurality of second ports; and
   a plurality of wavelength selective reflectors, said wavelength selective reflectors numbering N, each of said wavelength selective reflectors being coupled to a corresponding one of said optical switch second ports, each of said wavelength selective reflectors being selected to reflect optical signals at a predetermined one optical wavelength selected from a plurality of predetermined optical wavelengths, whereby optical signals at said predetermined one optical wavelength received at said first port are reflected back to said first port by a selected one of said wavelength selective reflectors.

2. Optical apparatus in accordance with claim 1, comprising:

a first substrate of electro-optic material, said optical switch being formed on said first substrate.

3. Optical apparatus in accordance with claim 2, wherein:

said optical switch comprises a 1×N switch.

4. Optical apparatus in accordance with claim 3, wherein said substrate comprises $LiNbO_3$.

5. Optical apparatus in accordance with claim 2 comprising:

a second substrate carrying said plurality of wavelength selective reflectors.

6. Optical apparatus in accordance with claim 5, wherein:

said second substrate comprises silicon.

7. Optical apparatus in accordance with claim 6, wherein:

said second substrate is bonded to said first substrate.

8. Optical apparatus in accordance with claim 1, wherein:

each of said wavelength selective reflectors comprises a reflective filter.

9. Optical apparatus in accordance with claim 8, wherein:

each of said reflective filters comprises a Bragg grating.

10. Optical apparatus in accordance with claim 8, wherein:

each of said reflective filters comprises a fiber Bragg grating.

11. Optical apparatus in accordance with claim 1, comprising:

a first substrate of electro-optic material, said optical switch being formed on said first substrate; and a second substrate, said plurality of wavelength selective reflectors being formed on said second substrate.

12. Optical apparatus in accordance with claim 11, wherein:

said second substrate comprises silicon.

13. Optical apparatus in accordance with claim 12, wherein:

said first substrate comprises $LiNbO_3$.

14. Optical apparatus in accordance with claim 11, wherein:

each of said wavelength selective reflectors comprises a Bragg grating.

15. Optical apparatus in accordance with claim 14, wherein:

each said Bragg grating is a fiber Bragg grating.

16. Optical apparatus in accordance with claim 11, wherein:

said second substrate is bonded to said first substrate.

17. Optical apparatus in accordance with claim 1, wherein:

said optical switch is polarization independent.

18. Optical apparatus in accordance with claim 1, wherein:

said optical switch is a 1×N switch.

19. Optical apparatus, comprising:

a substrate of electro-optic material;

a bi-directional optical switch formed on said substrate, said bi-directional optical switch having a first port and a plurality, N, of second ports, said optical switch being responsive to control signals for establishing an optical coupling between said first port and a selected one of said plurality of second ports; and a plurality of wavelength selective reflectors formed on said substrate, said wavelength selective reflectors numbering N, each of said wavelength selective reflectors being coupled to a corresponding one of said optical switch second ports, each of said wavelength selective reflectors being selected to reflect optical signals at a predetermined one optical wavelength selected from a plurality of predetermined optical wavelengths, whereby optical signals at said predetermined one optical wavelength received at said first port are reflected back to said first port by a selected one of said wavelength selective reflectors.

20. Optical apparatus in accordance with claim 19, wherein:

said optical switch comprises a 1×N switch.

21. Optical apparatus in accordance with claim 19, wherein wherein said substrate comprises $LiNbO_3$.

22. Optical apparatus in accordance with claim 19, wherein:

each of said wavelength selective reflectors comprises a reflective filter.

23. Optical apparatus in accordance with claim 22, wherein:

each of said reflective filters comprises a Bragg grating.

24. Optical apparatus in accordance with claim 19, wherein:

said optical switch is polarization independent.

25. Optical apparatus in accordance with claim 24, wherein:

said optical switch is a 1×N switch.

* * * * *